United States Patent Office 3,445,283
Patented May 20, 1969

3,445,283
PROCESS FOR THE PREPARATION OF INSTANTANEOUSLY SOLUBLE, POROUS GRANULAR SUGAR
Minoru Amano, Toru Nishihashi, Shozo Shinada, and Yushi Ito, Tokyo, Japan, assignors to Nissin Sugar Mfg. Co., Ltd., Tokyo, Japan, a corporation of Japan
No Drawing. Filed Dec. 13, 1965, Ser. No. 513,604
Claims priority, application Japan, Dec. 22, 1964, 39/72,070
Int. Cl. C13f 1/04
U.S. Cl. 127—58
12 Claims

ABSTRACT OF THE DISCLOSURE

A process for the preparation of instantaneously soluble, porous granular sugar having a uniform particle size which comprises cooling with agitation a sugar solution heated to a temperature within the range of 110–130° C. to crystallize the sugar in the form of micro-size fine sugar crystals; uniformly mixing the mixture of sugar crystals and uncrystallized sugar solution with 40 to 100% by weight of a hydrophilic liquid which does not dissolve sugar and which can be easily recovered by evaporation so as to form thin film coatings composed of the organic liquid and uncrystallized sugar solution on the surfaces of the sugar crystals; and thereafter separating the coated crystals from the the excess liquid of the system and granulating the same.

---

The present invention relates to a process for the preparation of porous, granular sugar which has no tendency to agglomerate in water but is instantaneously dispersible and soluble.

Sugar is essentially water-soluble, but in the attempt to dissolve granular sugar in water there is a tendency that the sugar is deposited on the bottom of the container and is not easily dissolved unless agitated. Again dissolving of finely powdered sugar in water is somewhat time-consuming because the sugar powder agglomerates in the water. Furthermore, such finely powdered sugar tends to agglomerate during storage due to its high hygroscopicity, and once agglomerated, it solidifies very hard and must be crushed in advance of its dissolving operation.

As means for preventing the moisture absorption of powdered sugar, various proposals have been made including mixing of starch therewith, wrapping the same with moisture-proof packing materials, and employment of special type warehouse or storing equipments. However, starch-added sugar makes the water turbid as dissolved therein and furthermore tends to change in taste or be contaminated with objectionable odor during its use and therefore has received no wide acceptance except for limited usages. Employment of special packing material, warehouse, storing equipments, etc. neither is desirable since such adds to the production cost. Attempts to impart instantaneous solubility to sugar by subjecting the same to certain type of treatment during or after its ordinary preparation procedures have also been reported, for instance, the processes of U.S. Patent 2,995,773 and U.S. Patent 3,143,428 are known, but none has been found perfectly satisfactory with respect to instantaneous solubility.

The object of the present invention is to eliminate the deficiencies in those conventional methods and provide a process to achieve the production of instantaneously soluble granular sugar and of uniform particle size if desired directly from sugar solution at a high yield.

Other objects of the invention will become clear from reading the following specification.

We found that the porous, granular sugar meeting these objects of the invention is obtained by the process comprising (1) agitating while cooling sugar solution which was heated to the temperature of 110–130° C. to crystallize the sugar in the sugar solution in the form of micro-size fine crystals, (2) mixing the resultant mixture of the fine sugar crystals with the uncrystallized sugar solution uniformly with a hydrophilic organic solvent which has no dissolving ability of sugar and is easily recoverable by evaporation, preferably with agitation, to bring about the formation of thin film coating composed of the organic solvent and the uncrystallized sugar solution on the surfaces of the crystallized sugar particles, (3) separating the excess liquid in the obtained produced mixture from the so coated sugar particles and thereafter subjecting the coated sugar particles to granulating and drying procedures, or (3') smashing the obtained produced mixture after film drying, or (3'') spray-drying the obtained produced mixture.

The sugar solution which is the starting material of the present invention, that is, the sugar solution in which sugar is heated to the temperature of 110–130° C., corresponds to an aqueous solution of sugar having a concentration of 80–95% by weight. Such sugar solution of the invention can be prepared by condensing by heating the refined sugar solution which has been refined in the ordinary manner in a sugar manufactory, or by condensing by heating commercially available liquid sugar, that has a low content of invert sugar, or by dissolving the commercially available granular or powdery sugar in water at the above-specified concentration.

When the temperature of the material sugar solution is below 110° C., i.e., when the sugar concentration in the sugar solution is below 80%; or when the temperature of the material sugar solution is higher than 130° C., i.e. when the sugar concentration in the sugar solution is higher than 95%, the above-described series of procedures fail to achieve the objects of the present invention. Namely in case of the former, not only the consumption of the organic solvent is uneconomically high but also the crystallization of the micro-size fine crystals of sugar becomes difficult, and even when such crystallization is somewhat achieved, the crystals are redissolved in the sugar solution to conspicuously lower the recovery ratio of the sugar as the final product. Again in the latter case, conversion of sugar or coloration thereof tends to take place during the heating, which not only lowers the recovery ratio of the product sugar but also is apt to produce inferior product mixed with colored sugar.

The agitation given during the cooling of the heated sugar solution functions as the impact force for crystallization of the micro-size fine crystals of sugar at the uniform size. If no agitation is given before the organic solvent is added thereto, particles of irregular sizes are crystallized and furthermore a portion of the particles are combined to form conglomerate which is the cause of unpleasant contact with a tongue.

As the hydrophilic organic solvent which does not dissolve sugar and is easily recoverable by evaporation, ethyl alcohol, acetone, methyl alcohol, etc. may be named, but for easy handling and hygienic reasons, use of ethyl alcohol is recommended.

These organic solvents may be mixed with the mixture of the sugar crystals and the uncrystallized sugar solution formed by agitating while cooling the sugar solution as aforesaid, or instead, it my be added to the sugar solution while the latter is being agitated under cooling. These organic solvents accelerate the crystallization of the fine sugar crystals from the sugar solution and at the same time function to make the sugar particles porous during the subsequent drying, as will be explained later.

As described above, the amount of sugar contained in the sugar solution varies depending on the temperature of the sugar solution, and the amount of the oganic solvent to be added must also be properly regulated according to the temperature of the sugar solution. Normally the amount of the organic solvent to be added is selected from the range of 40–100% by weight to the weight of the material sugar solution (i.e. the weight of the mixture of the sugar crystals and the uncrystallized sugar solution). When the amount of the oganic solvent added is too large, the desired particle diameter can hardly be obtained because the sugar tends to be powdered during the granulating operation. When it is too small, on the contrary, not only the subsequent granulating operation is difficult, but also the granules formed fail to exhibit the instantaneous solubility, because the content of the oganic solvent in the film coating formed on the surfaces of the crystallized sugar particles becomes low.

The crystallized sugar particles coated with the thin film composed of the added organic solvent and the uncrystallized sugar solution are then separated from the excess of the liquid, for example, by means of a centrifuge. At that time the degree of separation may be controlled with advantage to make the weight of the volatile component of the film (i.e., the sum of the organic solvent and water) to the weight of the coated, crystallized sugar particles 10–20%, for the ease of the subsequent granulating operation.

Thus coated crystallized sugar particles are then subjected to granulating and drying operations. It is preferred to first granulate the same to the desired size by means of known apparatus, particularly screen, and thereafter to dry the same. In case of screen-granulation, the granule diameter of the so formed granules normally ranges from 0.5–1.5 mm., although it varies depending on the said ratio of the weight of the volatile component of the film to the weight of the coated, crystallized sugar particles and other conditions.

Under the granulation, plurality of the crystallized sugar particles coated with the thin film composed of the organic solvent and the uncrystallized sugar solution are integrated into a single particulate aggregate. And, when the particulate aggregate is dried, the volatile component in the film coating the surfaces of the crystallized particles (organic solvent and water) evaporates. With the volatilization of the organic solvent in the film, multiple pores are formed on the surfaces of each of the particles and, simultaneously, plural spaces or voids are formed between the particles forming the particulate aggregate. Again, as the water in the film evaporates, fine crystals of sugar are crystallized, which serve to join the particles forming the particulate aggregate, functioning as bridges between the said particles. Thus as the synthetic result of the above procedures, the instantaneously soluble, porous granular sugar of uniform size aimed at in the present invention is formed.

Instead of granulation and drying, after separating the crystallized sugar particle coated by the thin film consisting of the organic solvent and the uncrystallized sugar solution from the excess of liquid as aforesaid, it is likewise possible without separating the excess liquid to first dry the particles by means of, for example, film drying, and thereafter to granulate the same, or to perform the drying simultaneously with granulation by means of, for example, spray drying. In these cases, though there is somewhat deviation in particle size, instantneously soluble, porous granular sugar of substantially the same quality to the above can be obtained.

In a preferred embodiment of the present invention, a material, sugar solution heated to about 120° C. is agitated while cooling, and when it is cooled to the temperature at which the evaporation and volatilization of the organic solvent do not substantially take place, an organic solvent in the amount of 55–100% by weight to the material sugar solution is uniformly mixed therewith. Then the crystallized sugar particles coated with the film composed on the organic solvent and the uncrystallized sugar solution are separated from the excess of the liquid. This film normally contains 80–85% by weight of the organic solvent and 2.5–4.5% by weight of the uncrystallized sugar. The degree of coating of the crystallized sugar particles is, as aforesaid, preferably such that the weight of the volatile component of the film (i.e. the sum of the organic solvent and water) is 10–20% to the weight of the coated, crystallized sugar particles. Accordingly, the separation of the coated, crystallized sugar particles from the excess of the liquid is controlled in consideration of the above. The so separated, coated crystallized sugar particles are granulated by means of a screen having openings of 0.6–0.8 mm. in diameter, and subsequently dried. The excess of the liquid removed from the coated, crystallized sugar and the organic solvent therefore can be reused as a portion of the material sugar solution after the organic solvent is recovered therefrom by means of distillation.

The porous, granular sugar thus obtained in accordance with the process of this invention has a granular diameter of 0.4–0.8 mm., a bulk density of 0.4–0.5, and contains 0.04–0.06% by weight of water. When this porous, granular sugar is thrown into water, the water penetrates into the multiple pores present on the surfaces of the sugar particles and the multiple spaces present between the sugar particles forming each of the aggregates of the sugar particles to first dissolve the fine, crystal sugar bridging and joining the sugar particles in the aggregate and consequently the sugar particles are loosened and dispersed in the water to be quickly dissolved. When each 20 grams of the granular sugar of this invention and known various forms of sugar were thrown into each 200 cc. of water of 5° C., 15° C., and 40° C. under agitation with a magnetic stirrer for comparing the dissolving speed (number of seconds required for the dissolving), the results were as in the table below.

|  | 5° C. (sec.) | 15° C. (sec.) | 40° C. (sec.) |
| --- | --- | --- | --- |
| Fine granulated sugar | 226 | 88 | 26 |
| Fine powdered sugar |  | 104 | 24 |
| Granular sugar of the invention | 25 | 8 | (¹) |

¹ Instantaneous.

Hereinafter the present invention will be explained with reference to the working examples which however are not meant to limit the scope of this invention.

EXAMPLE 1

One kilogram in terms of solid of pure sugar solution which was subjected to refining treatment in advance was taken and condensed by heating until its temperature reached 123° C. This sugar solution was violently agitated while being cooled with water to 20° C. to crystallize sugar in the form of micro-size fine crystals, thereby forming a fondant-like (creamy) mixture composed of the crystallized sugar solution. To the resultant mixture, 550 grams of 95% ethyl alcohol were added and uniformly mixed with the former under agitation.

Then the coated sugar particles were separated from the excess of the liquid using a centrifuge. The degree of separation was such that the liquid no more came out from the separated coated sugar particles in the form of drops under normal condition. (By such a degree of separation, a coating containing about 15% of the volatile component to the weight of the coated sugar particles was applied to the sugar particles.) Thus separated coated sugar particles were granulated using a screen having the openings of 0.8 mm. in diameter and subsequently dried at 85° C. by means of a hot air drier. 978 grams of the porous, granular sugar majority thereof having particle size of 0.6–0.8 mm. (yield=97.8%) were obtained.

EXAMPLE 2

To 200 grams the commercial refined sugar, 60 cc. of water added and heated to dissolve the sugar and the solution was condensed until its temperature reached 120° C. This sugar solution was violently agitated while being cooled with water to 15° C. to crystallize the sugar in the form of micro-size crystals. Thus obtained fondant-like (creamy) mixture was added, and uniformly mixed, with 200 grams of acetone which was cooled to 6° C. in advance to form a mixture of the coated sugar particles and the uncrystallized sugar solution.

Then the coated sugar particles were separated from the excess of the liquid by means of a centrifuge in such a manner that the sugar particles were imparted with the coating containing about 10% of the volatile component to the weight of the coated sugar particles. Thus separated, coated sugar particles were granulated using a screen having the openings of 0.6 mm. in diameter and dried in the same manner as described in Example 1. 194 grams of the porous, granular sugar majority thereof having particle size of 0.4–0.6 mm. (yield=97.0%) were obtained.

As in the above, the porous, granular sugar prepared in accordance with the process of this invention has very high rate of solubility in water, having uniform particle size since granulation by screen is possible, and furthermore has no tendency to agglomerate. Accordingly, it is unnecessary to add starch thereto or to give special consideration for its packing and storage. Still in addition, according to the process of this invention, crystallizing step and crushing step of sugar particles are dispensed with, and the product can be obtained at the yield quite close to 100%.

EXAMPLE 3

One kilogram in terms of solid of pure sugar solution which was subjected to refining treatment in advance was taken and condensed by heating until its temperature reached 123° C. This sugar solution was violently agitated while being cooled with water to 20° C. to crystallize sugar in the form of micro-size crystals, thereby forming a fondant-like mixture composed of the crystallized sugar solution. To said fondant-like mixture were added 550 grams of a 95% ethyl alcohol, the resultant mixture being uniformly mixed under agitation. The obtained slurry was dried by a spray dryer of a nozzle spray type having nozzles of a 3 mm. diameter. As a result, 996 grams of porous, granular sugar whose particle size being broadly varied within the range of 0.1–0.6 mm. were obtained (yield=99.6%).

We claim:

1. A process for the preparation of instantaneously soluble, porous granular sugar having uniform particle size which process comprises cooling, with agitation, and 80–95% by weight concentration sugar solution heated to a temperature within the range of 110–130° C. to thereby crystallize the sugar in the heated sugar solution in the form of micro-size fine sugar crystals; uniformly mixing the so formed mixture of sugar crystals and uncrystallized sugar solution with 40–100% by weight of a hydrophilic organic liquid which does not dissolve sugar and which is easily recoverable by evaporation so as to form thin film coatings composed of said organic liquid and said uncrystallized sugar solution on the surfaces of said sugar crystals; separating the so coated micro-size sugar crystals from the excess of the liquid of the system; and thereafter granulating and drying the separated, coated sugar crystals.

2. The process of claim 1 wherein said heated sugar solution is that obtained by concentrating the refined sugar solution obtained from the refining procedure in a sugar manufacturing step.

3. The process of claim 1 wherein said heated sugar solution is that obtained by concentrating an aqueous solution of commercial refined sugar.

4. The process described in claim 1 in which said heated sugar solution comprises commercially available liquid sugar.

5. The process described in claim 1 in which the organic liquid is ethanol.

6. A process for the preparation of instantaneously soluble, porous granular sugar having uniform particle size which process comprises cooling, with agitation, an 80–95% by weight concentration sugar solution heated to a temperature within the range of 110–130° C. to thereby crystallize the sugar in the heated sugar solution in the form of micro-size fine sugar crystals; uniformly mixing the so formed mixture of sugar crystals and uncrystallized sugar solution with 40–100% by weight of a hydrophilic organic liquid which does not dissolve sugar and which is easily recoverable by evaporation so as to form thin film coatings composed of said organic liquid and said uncrystallized sugar solution on the surfaces of said sugar crystals; separating the so coated sugar crystals from the excess of the liquid of the system so as to make the weight of the volatile component in the thin film 10–20% by weight of the coated sugar crystals; granulating the separated, coated sugar crystals, and thereafter drying the same.

7. The process of claim 6 wherein said heated sugar solution is that obtained by concentrating the refined sugar solution obtained from the refining procedure in a sugar manufacturing step.

8. The process described in claim 6 in which said heated sugar solution is that obtained by concentrating an aqueous solution of commercial refined sugar.

9. The process described in claim 6 in which said heated sugar solution comprises commercially available liquid sugar.

10. The process described in claim 6 in which the organic liquid is ethanol.

11. A process for the preparation of instantaneously soluble, porous granular sugar having uniform particle size which process comprises cooling, with agitation, an 80–95% by weight concentration sugar solution heated to a temperature within the range of 110–130° C. to thereby crystallize the sugar in the heated sugar solution in the form of micro-size fine sugar crystals; uniformly mixing the so formed mixture of sugar crystals and uncrystallized sugar solution with 40–100% by weight of a hydrophilic organic liquid which does not dissolve sugar and which is easily recoverable by evaporation so as to form thin film coatings composed of said organic liquid and said uncrystallized sugar solution on the surfaces of said sugar crystals; drying the coated sugar crystals; and crushing the dried, coated sugar crystals.

12. A process for the preparation of instantaneously soluble, porous granular sugar having uniform particle size which process comprises cooling, with agitation, an 80–95% by weight concentration sugar solution heated to a temperature within the range of 110–130° C. to thereby crystallize the sugar in the heated sugar solution in the form of micro-size fine sugar crystals; uniformly mixing the so formed mixture of sugar crystals and uncrystallized sugar solution with 40–100% by weight of a hydrophilic organic liquid which does not dissolve sugar and which is easily recoverable by evaporation so as to form thin film coatings composed of said organic liquid and said uncrystallized sugar solution on the surfaces of said sugar crystals; and spray-drying the coated sugar crystals.

References Cited

UNITED STATES PATENTS

| | | | |
|---|---|---|---|
| 2,943,004 | 6/1960 | Haury | 127—58 |
| 2,995,773 | 8/1961 | Gidlow et al. | 264—117 |
| 3,143,428 | 8/1964 | Reimers et al. | 99—141 |
| 3,219,484 | 11/1965 | Smythe | 127—58 |

MORRIS O. WOLK, *Primary Examiner.*

SIDNEY MARANTZ, *Assistant Examiner.*

U.S. Cl. X.R.

99—141; 127—30, 42, 46, 63